United States Patent [19]

Michaud

[11] 4,321,078
[45] Mar. 23, 1982

[54] SLOW RELEASE FERTILIZER COMPOSITION

[76] Inventor: Michael A. Michaud, Rte. 2, Box 26, Bastrop, La. 71220

[21] Appl. No.: 164,149

[22] Filed: Jun. 30, 1980

[51] Int. Cl.³ .............................................. C05B 21/00
[52] U.S. Cl. ........................................ 71/44; 71/33; 71/52; 71/53; 71/64.11
[58] Field of Search .................................. 71/1, 33–36, 71/40, 49, 51–53, 61–63, 64.11, 44; 423/303, 306, 310, 318, 430, 431, 545

[56] References Cited

U.S. PATENT DOCUMENTS 3,130,038  4/1964  Thomas et al. ..................... 71/64.11
3,342,579  9/1967  Frazier ................................. 71/51 X
3,992,184  11/1976  Baldock ................................. 71/62
4,028,088  6/1977  Young et al. ....................... 71/64.11

FOREIGN PATENT DOCUMENTS 54-146771  11/1979  Japan .

Primary Examiner—Kenneth M. Schor
Assistant Examiner—Ferris H. Lander
Attorney, Agent, or Firm—Perry Carvellas

[57] ABSTRACT

A slow release fertilizer composition providing to a plant a controlled amount of plant primary nutrients and micronutrients over a prolonged period of time is described. The solubility and concentration of each of the plant nutrients is determined by the addition to the fertilizer composition of specified fertilizer constituents or components which on going into solution coact to control at an optimum concentration each of the plant nutrients. The slow release fertilizer composition comprises the plant primary nutrients nitrogen, phosphorous, calcium, sulfur, magnesium, and potassium and the plant micronutrients iron, manganese, zinc, copper and boron. A single application of the fertilizer composition of the present invention provides sufficient plant nutrients for a full growing season or one or more growing seasons.

20 Claims, No Drawings

SLOW RELEASE FERTILIZER COMPOSITION

INTRODUCTION

The present invention relates to a fertilizer composition which releases plant nutrients into the soil at a controlled slow rate over a prolonged period such that a single application of fertilizer can be made where previously, several applications were required.

The present invention particularly relates to a novel fertilizer composition and to a process for the manufacture of the fertilizer. The present invention more particularly relates to a novel slow release fertilizer composition containing a substantially balanced plant nutrient composition. The fertilizer is formulated in a manner such that the plant primary nutrients and micronutrients are gradually released in a controlled manner over a prolonged period of time. The solubility and concentration of each of the plant nutrients available to the plant is determined by the incorporation in the fertilizer composition of specified fertilizer components or constituents and not by the relative amount of the fertilizer components in the fertilizer composition. The quantity of the specific primary and/or micronutrient compounds contained in the fertilizer composition will vary to some extent depending on the plants on which the fertilizer composition is to be used.

The slow release fertilizer composition of the present invention provides and makes available to the plant during its growth period the desired concentrations and amounts of the plant primary nutrients, nitrogen, phosphorus, calcium, sulfur, magnesium, and potassium and the plant micronutrients, iron, manganese, zinc, copper and boron.

PRIOR ART

The disadvantage is using many nitrogen-, phosphorous-, potassium-fertilizers sold commercially is that a substantial portion of the plant nutrients in the fertilizers, for example, nitrogen, is solubilized in the soil at a greater concentration than that which the plant can utilize these nutrients. As a result, it is frequently necessary to make several applications of fertilizer to the soil during the growing period to obtain maximum growth of the plant. Further, these types of fertilizers are inefficient because a substantial portion of the plant nutrients may be washed away from the plants before they can be utilized.

In more recent years, urea-formaldehyde resin materials have been used as a fertilizer material or constituent to provide nitrogen to plants. The nitrogen present in the urea-formaldehyde resin is relatively insoluble in water, however, the nitrogen is available to the plant at a relatively slow rate when applied to soils. As a result, the urea-formaldehyde resin may be used to supply nitrogen to the plant over a substantial portion of the growing period. The use of urea-formaldehyde to provide nitrogen has the disadvantage of being more expensive than ammonia phosphate fertilizers and is reported to give off toxic formaldehyde in the vicinity of the root system.

A method of reducing the solubility of the fertilizer components in soil had been to encapsulate the fertilizer components in a biodegradable material of lower solubility than the fertilizer component itself. This system has been of some assistance, but increases the overall cost of the fertilizer and frequently requires the addition to the fertilizer of another material.

It is well known that plant growth is influenced to a considerable degree by the availability of one or more of the so-called micronutrients, such as zinc, manganese, copper and iron compounds, and the like. However, excessive quantities of these micronutrients are toxic to plants and, therefore, when water soluble compounds of these micronutrients are applied to the soil, the quantity of these nutrients that is solubilized in the soil usually exceeds the plant requirements and may result in burning damage or may otherwise be detrimental to plant growth. On the other hand, when insoluble micronutrient compounds are added to the soil, micronutrient elements are not readily available to the plant.

However, the need to add micronutrients to soil has been recognized by agricultural research experts for some time. Micronutrient deficiencies have been found to exist in many soils, in many countries in the world, including the United States. These deficiencies vary in kind and amount in different locations. It has also been recognized that deficiencies in specific micronutrient values of the soil vary depending on the particular crop to be grown. As can be readily appreciated, the agricultural community is interested in the application of not only primary nutrients, but of the needed micro-nutrient values to a given soil in a controlled manner such that maximum crop production can be achieved in that soil. The lack of micro-nutrients, or too much, can produce a distinct and often dramatic difference from normal plant growth, thus emphasizing the need to make the micronutrient values available to the plant in controlled amounts during the plant growth period.

OBJECTS

It is an object of the present invention to provide a novel fertilizer composition and a novel process for the manufacture of fertilizer compositions containing plant nutrients in controlled degrees of solubility in order to provide plant nutrients to the plant over the entire growing period.

It is another object of the present invention to provide a novel fertilizer composition containing plant primary nutrient compounds and plant micronutrient compounds of controlled low but optimum solubilities such that the plant nutrients are made available to the plants over a sustained period of time.

It is another object of the present invention to prepare a slow release fertilizer composition which provides and makes available to a plant a balanced formulation of plant primary nutrients and plant micronutrients in a single application during the growth period of the plant and in a form that can be readily used by the plant.

It is another object of the present invention to prepare a slow release fertilizer composition which provides a balanced formulation of the plant primary nutrients and plant micro-nutrients.

It is another object of the present invention to prepare a fertilizer composition which provides optimum concentrations of desired plant nutrients.

It is another object of the present invention to provide a fertilizer composition which requires only one application of the fertilizer composition during the growth period of the plant.

It is another object of the present invention to provide a fertilizer composition which, depending on how much of the composition is applied, is capable of providing plant nutrients for one, two, three, or more crops in a single application.

It is another object of the present invention to provide a fertilizer composition in which the relative amounts of each of the plant nutrients are present in the amount used by a plant during its growth period, such that there is little or no residual salts left to build up in the soil.

It is another object of the present invention to provide a fertilizer composition in which the controlled solubilities of each of the nutrients is such that as the nutrients are absorbed and used by the plant, additional nutrients go into solution to maintain the availability of the nutrients to the plants as each of the nutrients are used.

It is another object of the present invention to provide a fertilizer composition formulated with a view to supplying a particular plant to which it is applied with the nutrient values required for optimum growth of that plant, such that all of the nutrients in the fertilizer are exhausted from the soil at about the same time.

It is still another object of the present invention to provide a fertilizer composition in which the components of the fertilizer composition, as they go into solution, provide a pH of about 6.5 to the soil during the growth period of the plant.

It is another object of the present invention to provide a fertilizer composition which can be used to supply the entire nutrient requirements of a plant and may be used as a potting soil without the danger of overfertilizing or damaging the plant due to excessive concentrations of any of the fertilizer components.

It is another object of the present invention to provide a fertilizer composition which is relatively low in cost and can be supplied in a single application for the entire growing season.

It is still another object of the present invention to provide a fertilizer composition which, due to the low and controlled solubilities and concentrations of each of the constituents of the composition, may be applied to a crop by dusting or spraying without damaging the crop.

BRIEF DESCRIPTION

The present invention is directed to a complete fertilizer composition comprising a substantially balanced plant nutrient composition in which each of the plant nutrients dissolve at a controlled rate to provide sufficient nutrients to the plant for controlled growth of the plant over the growing period of the plant. The fertilizer composition of the present invention provides in a slow release form, the primary nutrients nitrogen, phosphorus, calcium, sulfur, magnesium, and potassium and the micro-nutrients iron, manganese, zinc, copper and boron. The plant nutrients are combined in the composition in which each of them dissolve at a controlled rate over a prolonged period of time to provide sufficient amounts of plant nutrients for optimum growth of the plant.

Nitrogen, phosphate and calcium can conveniently be provided in the form of an ammoniated calcium phosphate compound (e.g. ammoniated super phosphate), additional calcium, and magnesium can be provided in the form of a readily available mineral dolomite ($MgCO_3 \cdot CaCO_3$). Calcium can also be provided as calcium phosphate. The iron, manganese, zinc and copper can be provided in the form of oxides or they can be provided as sulfates which are converted to oxides and the boron is conveniently provided in the form of boron phosphate.

The particular compounds present are critical in obtaining the slow release characteristics of the present invention. The slow release characteristic, that is, the relatively low solubility of each of the primary nutrients and micro-nutrients in the fertilizer composition as applied to the soil, is a function of the interaction and mutual solubilities or insolubilities of the constituents used to make up the fertilizer composition. The exact amounts of each of the primary nutrient compounds and of the micro-nutrient compounds is not important. The relative amounts of each of the constituents in the fertilizer composition is important and is determined by the particular plant to which the fertilizer composition is to be applied, that is, the relative amount the plant absorbs or uses of each of the nutrient ingredients during the growth period of the plant. It is important, however, that a sufficient amount of each of the constituents be present in a sufficiently soluble form in the fertilizer composition such that when water is added to the soil a portion of each of the constituents of the fertilizer composition goes into solution to buffer, that is, control the solubility and concentration of each of the other constituents in the fertilizer composition in the solution within the specified amounts.

As each of the nutrients are absorbed by the plant during its growth, more of the nutrient goes into solution and is available to the plant. The relative concentrations of each of the nutrients in solution thus remains about the same during the growth period of the plant. The fertilizer composition is made up in a manner such that substantially all of the nutrients are used up at about the same time, except for calcium and phosphate which are normally added in slight excess. In this manner, a sufficient and controlled total amount of fertilizer can be applied in a single application for a single crop, or for one or more crops, that is, for growing several crops one after the other in the same soil.

Since the amounts of each of the nutrients in solution and the availability to a growing plant at any particular time is controlled within relatively narrowly defined limits, the plants cannot be damaged or "burned" due to an excessive concentration of any particular nutrient being present in solution.

The exact amount of each of the constituents in the fertilizer composition is, as mentioned before, not important. The ratios of the individual constituents in the composition are important. The ratios are determined by the rate at which a plant, during its growth, uses the fertilizer constituents. The ratio of $NH_4CaPO_4 \cdot 7H_2O$ to $CaCO_3 \cdot MgCO_3$ can be 5 to 1 to 7 to 1, e.g., 6 to 1 and the ratio of $CaHPO_4 \cdot 2H_2O$ to $CaCO_3 \cdot MgCO_3$ can be 4.75 to 1 to 2.75 to 1, e.g., 3.75 to 1 to insure proper balance as the nutrients are taken up by the plants. It is important that each of the above-mentioned materials are present in the fertilizer composition and available in solution to buffer and maintain at equilibrium a controlled low concentration of each of the constituents. The fertilizer composition of the present invention provides a desired amount of each constituent dissolved in an equilibrium solution during the growth period of the plant such that substantially the entire fertilizer composition plays out at about the same time.

The sources of primary nutrients in the slow release fertilizer composition are advantageous for reasons to be discussed more fully below as follows:

$NH_4CaPO_4 \cdot 7H_2O$: Ammoniated Superphosphate

CaCO₃.MgCO₃: Dolomite
K₂SiO₃: Potassium Silicate

The sources of the micro-nutrients and sulfate in the slow release fertilizer composition are advantageous for reasons also to be discussed below as follows:

FeSO₄: Ferrous Sulfate
MnSO₄: Manganese Sulfate
ZnSO₄: Zinc Sulfate
CuSO₄: Copper Sulfate
BPO₄: Boron Phosphate As mentioned previously, the proportions of each of the ingredients are not critical and depend on the plant to which the fertilizer is to be applied. It is critical, however, that there is a sufficient amount of each of the ingredients present that some of each goes into solution when water is present to control the amount of each of the other ingredients that go into solution.

The slow release fertilizer composition of the present invention comprises as the primary nutrients nitrogen, phosphorous, calcium, sulfur, magnesium and potassium. The micro-nutrients present in the fertilizer composition comprise iron, manganese, zinc, copper and boron. The primary nutrient sulfur may be added to the fertilizer composition by the micro-nutrient sulfates, as part of the superphosphate formed by reacting with concentrated sulfuric acid and/or as calcium sulfate.

The slow release fertilizer composition of the present invention can comprise the following proportions of each of the constituents.

TABLE 1

| Primary Nutrients | | Broad Range % by Weight | Preferred Range % by Weight |
|---|---|---|---|
| NH₄CaPO₄ . 7H₂O | Ammoniated Superphosphate | 20–80 | 65–80 |
| CaHPO₄ . 2H₂O | Calcium Phosphate | 0–60 | 0–20 |
| CaCO₃ . MgCO₃ | Dolomite | 7–16 | 12–13 |
| K₂SiO₃ | Potassium Silicate | 5–30 | 7–9 |
| CaSO₄ | Calcium Sulfate | 0–25 | 6–8 |

| Micro-Nutrients | | Broad Range % by Weight | Range % by Weight |
|---|---|---|---|
| FeSO₄ | Ferrous Sulfate | 0.03 to 1.0 | 0.5 to 0.7 |
| MnSO₄ | Manganese Sulfate | 0.02 to 0.5 | 0.1 to 0.2 |
| ZnSO₄ | Zinc Sulfate | 0.01 to 0.1 | 0.02 to 0.03 |
| CuSO₄ | Copper Sulfate | 0.005 to 0.1 | 0.01 to 0.02 |
| BPO₄ | Boron Phosphate | 0.03 to 0.2 | 0.05 to 0.07 |

The micro-nutrient sulfates are converted prior to addition to the fertilizer composition to their corresponding oxides by reacting them with a portion of the dolomite.

In the embodiment of the invention in which the micro-nutrients are admixed in the fertilizer composition as the corresponding oxides the amounts used are as follows:

TABLE 1A

| | Micro-Nutrients | Broad Range % by Weight | Preferred Range % by Weight |
|---|---|---|---|
| Fe₂O₃ | Ferric Oxide | 0.02 to 0.5 | 0.25 to 0.4 |
| Mn₂O₃ | Manganese Oxide | 0.006 to 0.2 | 0.05 to 0.1 |
| ZnO | Zinc Oxide | 0.006 to 0.04 | 0.01 to 0.02 |
| CuO | Cupric Oxide | 0.0025 to 0.02 | 0.004 to 0.01 |
| BPO₄ | Boron Phosphate | 0.03 to 0.2 | 0.05 to 0.07 |

The amount of each of the elements in the Table 1 fertilizer composition is as follows:

TABLE 2

| | Weight Percent | | | | |
|---|---|---|---|---|---|
| | Broad Range | Preferred Range | | Broad Range | Preferred Range |
| N | 1–4 | 3–4 | C | 0.1–2.1 | 1.5–1.7 |
| Ca | 12–17 | 13–15 | Fe | 0.01–0.3 | 0.1–0.3 |
| P | 7–11 | 8–10 | Mn | 0.005–0.15 | 0.04–0.1 |
| Mg | 1.0–2.0 | 1.25–1.75 | Zn | 0.005–0.03 | 0.005–0.02 |
| K | 3–15 | 4–8 | Cu | 0.002–0.015 | 0.003–0.01 |
| S | 0.1–5 | 1–2 | B | 0.003–0.015 | 0.004–0.008 |

It is necessary in order to obtain the controlled slow release of the primary nutrients and micro-nutrients to have present and available, i.e. soluble in the fertilizer composition the following materials:

$NH_4^+$, $PO_4^{-3}$, $Ca^{+2}$, $Mg^{+2}$, $K^{+1}$, $SO_4^{-2}$, $Fe^{+3}$, $Zn^{+2}$, $Cu^{+2}$ and $Mn^{+3}$, $B^{+3}$, $CO_3^{-2}$, $HCO_3^{-1}$ and $SiO_3^{-2}$.

The concentration in an aqueous solution at equilibrium of each of the elements of the fertilizer composition of Tables 1, 1A and 2, as used in soil is as follows:

TABLE 3

| | Parts Per Million In Solution | | | | |
|---|---|---|---|---|---|
| | Broad Range | Preferred Range | | Broad Range | Preferred Range |
| NH₄ | 12–50 | 25–35 | Fe | 0.1–5 | 0.15–.25 |
| Ca | 150–500 | 175–225 | Mn | 0.2–0.7 | 0.4–0.6 |
| PO₄ | 13–185 | 75–125 | Zn | 0.02–0.2 | 0.15–0.25 |
| Mg | 15–60 | 45–55 | Cu | 0.01–0.08 | 0.03–0.05 |
| K | 100–500 | 125–175 | B | 0.2–3.0 | 0.4–0.6 |
| SO₄ | 150–1200 | 550–650 | | | |
| CO₃ | 10–75–200 | 75–125 | | | |

The amount of fertilizer composition applied in a single application can be for a single crop, for one or more crops, for one month, or for one, two or three years, depending on the amount of fertilizer it is desired to apply. This is possible because of the controlled slow release characteristics of the present invention to prevent excess fertilizer release that would burn or damage plants and to prevent the fertilizer from being leached out or lost by water run-off.

ADVANTAGES

The slow release fertilizer composition contains specific compounds that when put into water coact or interact to dissolve into solution controlled small amounts of plant primary nutrients and plant micro-nutrients. As water is added to the soil containing the fertilizer composition, only small limited amounts of the nutrients go into solution. As the nutrients are taken up by the plants, additional fertilizer or nutrients dissolve to maintain the dissolved nutrients in solution at about the same concentration. As the water evaporates, the fertilizer in solution precipitates. There is no possibility of burning the plants by over-fertilization or of losing fertilizer by water run-off since only a small controlled amount of fertilizer is soluble in water at any particular time.

The fertilizer composition is mixed to provide all the nutrients required by the plant in the proportions that the nutrients are used by the plant, such that there is little or none of the fertilizer remaining at the end of the plant growth period. That is substantially all of the constituents of the fertilizer are used up at about the same time.

The fertilizer composition as the various constituents are dissolved and used up during the growth period of the plant tend to buffer the soil to which it is applied at a pH between about 6 and 7, e.g., pH 6.5 to about a neutral pH.

The fertilizer composition, because of its low controlled solubility, is not readily leached under high rainfall or heavy irrigation. The overall leach rate for the composition is about 0.1% or about 1000 parts per million. After a heavy rainfall or a period of irrigation, the dissolved fertilizer on evaporation of the water merely precipitates out of solution.

Because of the slow release characteristic and low solubility of the constituents of the fertilizer composition, the composition can be used safely as a potting soil to supply the entire nutrient requirements for the life of the plant.

The fertilizer composition may be applied by dispersing in an aqueous carrier or as a dust, after the crops have been planted and growth started, without burning or otherwise damaging the plants.

The fertilizer composition is non-hydroscopic and does not readily cake or lump, making for ease in handling and application.

The constituents or components of the fertilizer composition of the present invention are readily available at low cost, thus making possible the formulation of a low cost fertilizer.

REACTANTS

The term "primary nutrient" is intended to mean those nutrients that make up the major components of the fertilizer composition and comprise nitrogen, phosphorous, calcium, sulfur, magnesium and potassium. The term "micro-nutrients" comprise iron, manganese, zinc, copper and boron. The primary and micro-nutrients are supplied to the fertilizer composition as salts or oxides of the respective elements. The important consideration in applying the primary and micro-nutrients to the soil is that they are properly selected for use with the soil and the particular crops and that they be provided in a form for a controlled slow release to the plants upon application of water to the soil containing the primary and micro-nutrients in order that the desired amount of nutrient elements can be delivered to the soil and made available to the plant root system growing therein.

The primary nutrients nitrogen, phosphorous and calcium can be supplied to the fertilizer composition in the form of ammoniated superphosphate and ($NH_4CaPO_4.7H_2O$). The ammoniated superphosphate can be made by reacting a 30% ammonium hydroxide solution with superphosphate to obtain the ammoniated superphosphate as a precipitate. The ammoniated superphosphate may be washed several times with water to remove readily soluble ammonium ions. An acceptable solubility of ammonium ions after washing is about 30 ppm of $NH_4^+$. Ammoniated superphosphate, however, is commercially available and if desired can be purchased.

The superphosphate can be made by reacting a crystalline calcium fluorphosphate mineral (apatite) with concentrated phosphoric acid to obtain superphosphate, a mixture of $Ca_3(PO_4)_2$, $Ca(H_2PO_4)_2$ and $CaHPO_4$. The apatite mineral can also be reacted with concentrated sulfuric acid in which case the superphosphate product obtained can contain $CaSO_4$. Mixtures of concentrated sulfuric acid and concentrated phosphoric acid can also be used to obtain superphosphate from the mineral apatite. This reaction, though providing a source of sulfate for the fertilizer composition, reduces the amount of phosphate available to the fertilizer composition.

The ammonium and phosphate can be supplied to the fertilizer composition in the form of magnesium ammonium phosphate ($MgNH_4PO_4$). This alternative would provide about the same amount of phosphate, slightly increased amounts of ammonia, but would reduce the amount of calcium. The magnesium ammonium phosphate could also be a source of magnesium for the fertilizer composition and can be used in place of the dolomite ($MgCO_3.CaCO_3$). If the magnesium ammonium phosphate were used in place of dolomite, calcium sulfate would have to be added to supply calcium and sulfate, for example, as gypsum.

However, magnesium ammonium phosphate is more expensive than ammoniated superphosphate as a source for ammonia and phosphate and is more expensive than dolomite as a source of magnesium. The ammoniated superphosphate ($NH_4CaPO_4.7H_2O$) and the dolomite are therefore preferred constituents of the fertilizer composition.

The calcium, magnesium, potassium, ammonium, phosphate, carbonate, sulfate and silicate ions, when put in solution by rain or irrigation water, also function to reduce the solubilities of each other, thereby allowing a sustained slow release of the nutrients.

The preferred source of the nutrient magnesium and a secondary source of the nutrient calcium is the mineral dolomite ($MgCO_3.CaCO_3$) which is readily commercially available and inexpensive. Magnesium carbonate could be used as an alternate source for the magnesium of dolomite, but is more expensive and would reduce the amount of calcium available. Calcium carbonate could also be used in place of the dolomite to react with the micro-nutrient sulfates to obtain the micro-nutrient oxides.

In a preliminary step to formulating the fertilizer composition of the present invention, a portion of the dolomite is reacted with the micro-nutrients ferrous sulfate ($FeSO_4$), manganese sulfate ($MnSO_4$), zinc sulfate ($ZnSO_4$), and copper sulfate ($CuSO_4$) to put the micro-nutrients in a less soluble form such that they are available over a prolonged period of time. The calcium carbonate in the dolomite is the principle reactant and a small amount of it reacts with the micro-nutrient sulfates to form micro-nutrient carbonates and calcium sulfate. This reaction also makes available in the fertilizer composition a source of sulfur nutrient. To carry out this reaction, a concentrated aqueous solution of the micro-nutrient sulfates is mixed with a relatively large amount of dry powdered dolomite, heated to a temperature of 80° to 100° C., preferably 95° to 100° C., for 0.5 to 2 hours, preferably 0.75 to 1.25 hours, or until the water evaporates. As mentioned above, a small portion of the calcium carbonate of the dolomite is converted to calcium sulfate and the micro-nutrients are converted to the corresponding micro-nutrient carbonates. The mixture is then heated to 350° to 450° C., preferably 350° to 400° C., for 0.5 to 2 hours, preferably 0.75 to 1.25 hours. The micro-nutrient carbonates are decomposed to the corresponding micro-nutrient oxides, i.e., iron oxide, manganese oxide, zinc oxide and copper oxide. The reaction temperature is sufficiently low, however, that the magnesium carbonate does not decompose and the calcium carbonate content of the dolomite that does not react with the micro-nutrients does not decompose. The iron, manganese, zinc and copper sulfates are initially converted to their corresponding carbonates. The iron, manganese, zinc and copper carbonates on continued heating are converted substantially to the corresponding oxides. It is necessary to convert the micro-nutrients to their oxides since, in the form of either sulfates or carbonates, they are too soluble to obtain the desired slow release and may form complexes. The heating and conversion of the iron carbonate, manganese carbonate, zinc carbonate and copper carbonate is accompanied by popping and the reaction is carried out until the popping ceases which indicates the substantial conversion of the micro-nutrients to their oxides is completed. The mixture may be washed to remove soluble compounds. The iron turns, during the reaction, a rust color and the manganese turns a black color. The zinc and copper turn white and gray colors, respectively. Only a small amount of the dolomite takes part in the reaction and most of the dolomite remains unreacted in its original form ($MgCO_3 \cdot CaCO_3$). It is important that the reaction temperature does not exceed 700° C. so as to prevent the decomposition of the carbonates of the $MgCO_3 \cdot CaCO_3$. However, the small amount of the calcium carbonate of the dolomite that reacts with the micro-nutrient sulfates is converted to calcium sulfate, thus providing a source of sulfate ion for the fertilizer composition. The carbonate ion of the dolomite in the fertilizer composition does provide a buffering function to control the solubility of other plant nutrients.

The compound potassium silicate is used as a source of potassium nutrient for the fertilizer composition. The potassium silicate is readily available and is relatively expensive, but highly concentrated in potassium. As an alternative source of potassium, the compound magnesium potassium phosphate could be used as a source of potassium, but would provide excess amounts of magnesium and phosphorous in the fertilizer composition. The potassium silicate, however, is preferred because of its easy availability and low solubility. The potassium silicate as received may be washed with water several times to remove any readily soluble potassium compounds. The desired solubility of potassium after washing is about 250 ppm.

The micro-nutrients iron, manganese, zinc and copper can be provided in the manner described above by reacting iron, manganese, zinc and copper sulfates with dolomite, i.e., $MgCO_3 \cdot CaCO_3$ to obtain the corresponding iron, manganese, zinc and copper oxides. Alternatively, these micro-nutrients may be added directly to the fertilizer composition as iron oxide, manganese oxide, zinc oxide and copper oxide. As mentioned above, if the micro-nutrients are added as their oxides, then calcium sulfate is added to provide sulfate ions to supply the sulfur nutrient required in the fertilizer composition.

The iron oxide, manganese oxide, zinc oxide and copper oxide have very low solubility in solution, providing a slow sustained release of the micro-nutrients to the soil.

The micro-nutrient boron is readily obtained by reacting an aqueous solution of concentrated boric acid ($H_3BO_3$) with superphosphate (i.e., a mixture of monocalcium phosphate and dicalcium phosphate [$Ca(H_2PO_4)_2$ and $CaHPO_4$], boiling to dryness and then reacting at a temperature of 350° to 450° C., preferably 375° to 425° C., for 1 to 4 hours, preferably 3 to 4 hours. The reaction product consists of boron phosphate ($BPO_4$) and calcium phosphate ($Ca_3(PO_4)_2$) and unreacted superphosphate all which can be used in the fertilizer composition. The reaction product may be washed to remove readily soluble compounds. The desired solubility of the boron in the washed boron phosphate is about 1.5 ppm.

A list of the primary nutrients and of the micro-nutrients, the soluble anions and cations and suitable source compounds are given in the Table below.

TABLE 4

| Primary Nutrient | Soluble Anion Cations | Compound |
|---|---|---|
| N | $NH_4^+$ | $NH_4CaPO_4 \cdot 7H_2O$ $MgNH_4PO_4$ |
| P | $PO_4^{-3}$ | $NH_4CaPO_4 \cdot 7H_2O$ $Ca_3PO_4, CaHPO_4, BPO_4$ |
| Ca | $Ca^{+2}$ | $NH_4CaPO_4 \cdot 7H_2O$ $MgCO_3 \cdot CaCO_3, CaSO_4$ |
| S | $SO_4^{-2}$ | $CaSO_4$ $FeSO_4, MnSO_4, ZnSO_4, CuSO_4$ |
| Mg | $Mg^{+2}$ | $MgCO_3 \cdot CaCO_3$ $MgNH_4PO_4, MgCO_3$ |
| K | $K^+$ | $K_2SiO_3$ |
| — | $CO_3^{-2}$ | $MgCO_3 \cdot CaCO_3, MgCO_3, CaCO_3$ |
| — | $SiO_3^{-2}$ | $K_2SiO_3$ |

| Micro-nutrients | Cation | Compounds |
|---|---|---|
| Fe | $Fe^{+3}$ | $FeSO_4, Fe_2O_3, Fe_3O_4$ |
| Mn | $Mn^{+3}$ | $MnSO_4, Mn_2O_3, Mn_3O_4$ |
| Zn | $Zn^{+2}$ | $ZnSO_4, ZnO$ |
| Cu | $Cu^{+2}$ | $CuSO_4, CuO$ |
| B | $B^{+3}$ | $BPO_4$ |

EXAMPLES

The utility of the invention is illustrated by the following examples without any intention that the invention be limited thereto.

EXAMPLE 1

In an example of a preferred embodiment of the invention, a slow release fertilizer composition is prepared using the following ingredients.

|  | Pounds |
|---|---|
| $NH_4CaPO_4 \cdot 7H_2O$ | 79.0 |
| $MgCO_3 \cdot CaCO_3$ | 12.0 |
| $K_2SiO_3$ | 8.0 |
| $FeSO_4$ | 0.66 |
| $MnSO_4$ | 0.22 |
| $ZnSO_4$ | 0.03 |
| $CuSO_4$ | 0.02 |
| $BPO_4$ | 0.07 |

The iron sulfate, manganese sulfate, zinc sulfate and copper sulfate are dissolved in water and mixed with 1.20 pounds of $MgCO_3 \cdot CaCO_3$. The mixture is heated at 80° to 100° C. for about one hour to evaporate water and dry the mixture. The dry mixture is heated at 400° C. for 2 hours, a portion of the $CaCO_3$ of the dolomite initially reacts with the iron, manganese, zinc and copper sulfates to form iron, manganese, zinc and copper carbonates. After continued heating, the iron and manganese carbonates decompose accompanied by "popping noise" to form iron oxide (rust-red color) and manganese oxide (black color). The copper carbonate decomposes to copper oxide and copper hydroxide (gray color). The zinc carbonate decomposes to zinc hydroxide and zinc oxide (white color). The reaction is continued until the popping stops to obtain intermediate product I. The reaction product can be washed to remove any unreacted compounds.

The boron phosphate is prepared by mixing a concentrated aqueous solution containing 0.10 lb. of boric acid ($H_3BO_3$) with 0.80 lb. of superphosphate containing a mixture of $CaHPO_4.2H_2O$ and $Ca(H_2PO_4)_2.H_2O$. The mixture is heated at a temperature of 80° to 100° C. for one hour until dry. The dry mixture is further heated at 350° C. to 400° C. for 4 hours. A dry mixture consisting primarily of boron phosphate ($BPO_4$) and calcium phosphate ($Ca_3(PO_4)_2$) intermediate product II is obtained. Since the calcium phosphate is used as a plant nutrient, the entire mixture is used in the fertilizer composition. The reaction product can be washed to remove any readily soluble compounds.

The intermediate product I obtained by reacting the iron, manganese, zinc and copper sulfates with a portion of the dolomite are mixed with the intermediate product II obtained by reacting boric acid with calcium hydrogen phosphate and then mixed with the remaining dolomite and the potassium silicate added and thoroughly mixed therewith to obtain mixture III.

The mixture III containing the micro-nutrients, dolomite and the potassium silicate is then mixed with the ammoniated superphosphate ($NH_4CaPO_4.7H_2O$) to make the fertilizer composition of the present invention.

This particular formulation can be used with corn, wheat, cotton, sugar cane and similar type crops.

An application of 1500 lbs. per acre for growing corn, wheat, and cotton is adequate fertilizer for three growing cycles, that is for planting three crops with a single application of the fertilizer composition. The amount of fertilizer actually applied, however, will vary to some extent with the average rainfall, the frequency and amount of irrigation and the amount of fertilizer removed through harvesting the crop and the amount removed by water run-off.

To determine the solubility of the constituents of the fertilizer composition, ten pounds of the fertilizer was added to a container containing one gallon of water. The fertilizer composition was dissolved to the extent that a concentration of about 1000 ppm was obtained and the remainder was insoluble and settled on the bottom of the container.

A sample of the aqueous solution, at equilibrium, was analyzed for the elements in solution and the results obtained are given below.

| PPM | | | |
|---|---|---|---|
| $N^{(1)}$ | 25 | Fe | .20 |
| $P^{(2)}$ | 37 | Mn | .35 |
| Ca | 200 | Zn | 0.2 |
| $S^{(3)}$ | 200 | Cu | 0.04 |
| Mg | 50 | B | 1.5 |
| K | 150 | | |
| $C^{(4)}$ | 20 | | |

(1) Present as $NH_4^+$;
(2) as $PO_4^{-3}$;
(3) as $SO_4^{-2}$;
(4) as $CO_3^{-2}$ and $HCO_3^{-1}$.

EXAMPLE 2

In another embodiment of the invention, a slow release fertilizer composition is prepared using the following ingredients:

| | Pounds |
|---|---|
| $NH_4CaPO_4.7H_2O$ | 78.0 |
| $MgCO_3.CaCO_3$ | 12.3 |
| $K_2SiO_3$ | 8.0 |
| $CaSO_4$ | 1.0 |
| $Fe_2O_3$ | 0.40 |
| $Mn_2O_3$ | 0.20 |
| ZnO | 0.02 |
| CuO | 0.01 |
| $BPO_4$ | 0.07 |

The boron phosphate is prepared as in Example 1.

The iron, manganese, zinc and copper oxides are mixed with the boron phosphate and then added to and thoroughly mixed with the dolomite and potassium silicate. This mixture is then mixed with the ammoniated superphosphate to prepare the slow release fertilizer composition.

The composition, as prepared, is washed ten times at a one-to-one water to fertilizer ratio. To determine the solubility of the constituents of the fertilizer composition two pounds of the washed fertilizer composition is added to one gallon of water. The fertilizer composition was dissolved to the extent that a concentration of about 1000 ppm was obtained and the remainder was insoluble and settled on the bottom of the container.

A sample of the aqueous solution at equilibrium was analyzed for the elements in solution and the results obtained are given below:

| PPM | | | |
|---|---|---|---|
| $N^{(1)}$ | 24 | Fe | .18 |
| $P^{(2)}$ | 36 | Mn | .30 |
| Ca | 180 | Zn | 0.2 |
| $S^{(3)}$ | 200 | Cu | 0.03 |
| Mg | 45 | B | 1.3 |
| K | 120 | | |
| $CO_3^{(4)}$ | 90 | | |

(1) Present as $NH_4^+$;
(2) as $PO_4^{-3}$;
(3) as $SO_4^{-2}$;
(4) as $CO_3^{-2}$ and $HCO_3^{-1}$.

The fertilizer composition can be used with tomatoes, and most other plant crops.

An application of 2000 lbs. per acre for growing tomatoes is adequate for five growing cycles of twelve months, each crop.

EXAMPLE 3

Where the fertilizer composition is to be used to grow legume type plants, the composition is reduced in the total amount of nitrogen present since the legume plants provide to a large extent the nitrogen required. A formulation for application to legume plants is prepared by using the following ingredients.

| | Pounds |
|---|---|
| $NH_4CaPO_4.7H_2O$ | 28.0 |
| $CaHPO_4.2H_2O$ | 49.3 |
| $K_2SiO_3$ | 9.0 |
| $CaCO_3.MgCO_3$ | 12.0 |
| $CaSO_4$ | 1.0 |
| $Fe_2O_3$ | 0.04 |
| $Mn_2O_3$ | 0.20 |
| ZnO | 0.02 |
| CuO | 0.01 |
| $BPO_4$ | 0.07 |

The boron phosphate is prepared as in Example 1, and the constituents are mixed in the manner described in Example 2, that is, the ammoniated superphosphate is mixed with the calcium hydrogen phosphate before mixing with the other ingredients.

The ingredients are thoroughly mixed and washed with water to remove readily soluble compounds. To determine the solubility of the constituents of the fertilizer composition five pounds of the washed composition is added to one gallon of water.

The fertilizer composition was dissolved to the extent that a concentration of about 1000 ppm was obtained and the remainder was insoluble and settled on the bottom of the container.

A sample of the aqueous solution at equilibrium was analyzed for the elements in solution and the results obtained are given in the table below.

| PPM | | | |
|---|---|---|---|
| $N^{(1)}$ | 26 | Fe | .19 |
| $P^{(2)}$ | 35 | Mn | .38 |
| Ca | 190 | Zn | .13 |
| $C^{(3)}$ | 220 | Cu | .03 |
| Mg | 55 | B | 1.6 |
| K | 135 | | |
| $CO_3^{(4)}$ | 100 | | |

(1) Present as $NH_4^+$;
(2) as $PO_4^{-3}$;
(3) as $SO_4^{-2}$;
(4) as $CO_3^{-2}$ and $HCO_3^{-1}$.

EXAMPLE 4

The fertilizer composition of Example 1 can be applied in a single application for the entire growing season of the below listed crops at the rates(1) indicated for the specified plants.

(1) The amount of fertilizer applied will vary depending upon the average rainfall, the frequency and amount of irrigation and the amount of fertilizer removed by water run-off.

| Crop | Pounds/Acre |
|---|---|
| Tomatoes | 300 to 600 |
| Corn | 300 to 600 |
| Wheat | 250 to 500 |
| Sugar Cane | 600 to 1200(2) |
| Rice | 250 to 500 |
| Cotton | 250 to 500 |

(2) Amount for two years.

EXAMPLE 5

The fertilizer composition of Example 3 can be applied in a single application for the entire growing season of the below listed legume type crops at the rates(1) indicated for the specific plants.

(1) The amount of fertilizer applied will vary depending upon the average rainfall, the frequency and amount of irrigation and the amount of fertilizer removed by water run-off.

| Crop | Pounds/Acre |
|---|---|
| Lima beans | 200 to 500 |
| Peas | 200 to 500 |
| Soybeans | 200 to 500 |

UTILITY

The fertilizer composition of the present invention containing a mixture of primary nutrients and micro-nutrients is applied to the soil, the primary nutrients and micro-nutrients are released to the plant at a relatively uniform slow rate during the entire growing season and at a concentration which is not toxic to the plants.

The novel fertilizer composition is prepared by mixing the ingredients in the desired amounts. The fertilizer constituents can be introduced into a rotating granulator and ground to the desired particle size range, dried and screened to recover product of the desired particle size. Oversized particles can be crushed and returned to the screens.

The fertilizer composition does not agglomerate, is readily flowable through a spreader, will not burn plant life, and is a good soil buffer that contains a sufficient and proper amount of the known plant nutrients essential to promoting healthy soil and plant life in a single application fertilizer composition product.

The composition is preferably applied to the soil as a powder having a particle size of 0.01 to 0.5, preferably 0.05 to 0.2 and more preferably 0.07 to 0.1 mm. The composition, however, can be formed into small pellets of 0.5 to 3, preferably 2 to 3 mm size and applied to the soil using conventional application means. The dry powder can be applied to growing plants or soil by dusting in a conventional manner. Where a dust is used the particle size is preferably about 0.5 mm. The dry powder can also be dispersed in an aqueous carrier solution and applied in a conventional manner by spraying the growing plants and/or to the soil with the aqueous dispersion. Where an aqueous dispersion is used the particle size is preferably about 0.05 mm.

The proportion or amount of each of the ingredients of the fertilizer composition applied to a specified plant or crop can be determined by analyzing the plant for the inorganic portion of the plant for the nutrient corresponding to the chemicals in the composition.

A sufficient amount of the chemical is added to the composition such that the ratio of the chemicals correspond to the ratio of the inorganic weight of nutrients in the plant.

The elements calcium and phosphorus are normally added in slight excess to obtain the desired amount of nitrogen in the fertilizer. The fertilizer composition will play out about evenly with calcium phosphate remaining in the soil. Any remaining calcium phosphate will not harm the soil or adversely affect the pH of the soil.

As previously mentioned, the ratio of chemicals in the fertilizer composition does not determine the concentration of the nutrients or ions in the soil solution. These concentrations are determined by mutual solubility of the nutrients and ions in the final solution mix.

The invention is not to be limited by the above disclosure but by the following appended claims.

What is claimed:

1. A slow release fertilizer composition consisting essentially of

| | % by Weight |
|---|---|
| (a) Primary Nutrients | |
| $NH_4CaPO_4 \cdot 7H_2O$ | 20–80 |
| $CaHPO_4$ | 0–60 |
| $CaCO_3 \cdot MgCO_3$ | 7–16 |
| $K_2SiO_3$ | 5–30 |
| $CaSO_4$ | up to 25 |
| (b) Micro-Nutrients | |
| $Fe_2O_3$ | 0.02–0.5 |
| MnO | 0.006–0.2 |
| ZnO | 0.006–0.04 |
| CuO | 0.0025–0.02 |

-continued

|  | % by Weight |
|---|---|
| BPO$_4$ | 0.03–0.2 |

2. The slow release fertilizer composition of claim 1 containing the following elements:

|  |  | % by Weight |
|---|---|---|
| (a) | Primary Nutrients | |
| | N | 1–4 |
| | Ca | 12–17 |
| | P | 7–11 |
| | Mg | 1–2 |
| | K | 3–15 |
| | S | 0.1–5 |
| (b) | Micro-Nutrients | |
| | Fe | 0.01–0.3 |
| | Mn | 0.005–0.15 |
| | Zn | 0.005–0.03 |
| | Cu | 0.002–0.015 |
| | B | 0.003–0.015 |

3. An aqueous solution containing the slow release fertilizer composition of claim 1 in which the concentrations of the active ingredients are:

|  |  | PPM |
|---|---|---|
| (a) | Primary Nutrients | |
| | NH$_4$ | 12–50 |
| | Ca | 150–500 |
| | PO$_4$ | 13–185 |
| | Mg | 15–60 |
| | K | 100–500 |
| | SO$_4$ | 150–1200 |
| (b) | Micro-Nutrients | |
| | Fe | 0.1–5 |
| | Mn | 0.2–0.7 |
| | Zn | 0.02–0.2 |
| | Cu | 0.01–0.08 |
| | B | 0.2–3.0 |
| (c) | Other | |
| | CO$_3$ | 10–200 |

4. A method of applying a slow release fertilizer composition in a single application which provides sufficient plant nutrients for one to three years for growing crops which comprises applying the fertilizer composition of claim 1 at a rate of 200 to 1500 lbs. per acre.

5. The method of claim 4 wherein the crop grown is a member selected from the group consisting of tomatoes, corn, wheat, sugar cane, rice and cotton and the fertilizer composition is applied at a rate of 250 to 600 pounds/acre.

6. The method of claim 4 wherein the crop grown is a member selected from the group consisting of lima beans, peas and soybeans and the fertilizer composition is applied at a rate of 200 to 500 pounds/acre.

7. The method of claim 4 wherein the amount of fertilizer composition applied is for a single year of growing crops and is in the amount of 200 to 600 lbs. per acre.

8. The method of claim 4 wherein the amount of fertilizer composition applies is for three years of growing crops and is in the amount of 600 to 1500 lbs. per acre.

9. The method of claim 4 wherein the slow release fertilizer is used as the entire substrate in which the plants are grown.

10. The method of claim 4 wherein the fertilizer composition is admixed with an inert substrate in which the plants are grown.

11. A process for preparing a slow release fertilizer composition which comprises:
  (a) adding a concentrated aqueous solution of FeSO$_4$, MnSO$_4$, ZnSO$_4$ and CuSO$_4$ to a relatively large amount of CaCO$_3$.MgCO$_3$ and thoroughly mixing the aqueous solution with the CaCO$_3$.MgCO$_3$;
  (b) heating the mixture at a temperature of 80° to 100° C. for 0.5 to 3 hours to convert the FeSO$_4$, MnSO$_4$, ZnSO$_4$ and CuSO$_4$ to the corresponding FeCO$_3$, MnCO$_3$, ZnCO$_3$ and CuCO$_3$ and a small portion of the CaCO$_3$ of the CaCO$_3$.MgCO$_3$ to CaSO$_4$ and to dry the mixture;
  (c) further heating the dry mixture at a temperature of 350° to 450° C., for 0.5 to 3 hours to decompose the FeCO$_3$, MnCO$_3$, ZnCO$_3$ and CuCO$_3$ to the corresponding Fe$_2$O$_3$, Mn$_2$O$_3$, ZnO and CuO to obtain an intermediate product I;
  (d) adding concentrated aqueous solution of H$_3$BO$_3$ to a relatively large amount by weight of a phosphate mixture of CaHPO$_4$ and Ca(H$_2$PO$_4$)$_2$ and heating to dryness;
  (e) further heating the dried H$_3$BO$_3$ and phosphate mixture at a temperature of 350° to 450° C. for 1 to 4 hours to obtain BPO$_4$ and Ca$_3$(PO$_4$)$_2$ and unreacted phosphate, as intermediate product II;
  (f) the intermediate product I is mixed with intermediate product II and CaCO$_3$.MgCO$_3$ and potassium silicate and thoroughly mixed together to obtain mixture III;
  (g) the mixture III is then mixed with NH$_4$CaPO$_4$.7-H$_2$O;
  (h) optionally washing the mixture to remove readily soluble compounds; and
  (i) drying the mixture to obtain the slow release fertilizer composition.

12. A slow release fertilizer composition consisting essentially of:

|  |  | % by Weight |
|---|---|---|
| (a) | Primary Nutrients | |
| | NH$_4$CaPO$_4$ . 7H$_2$O | 65–80 |
| | CaCO$_3$ . MgCO$_3$ | 12–13 |
| | K$_2$SiO$_3$ | 7–9 |
| | CaSO$_4$ | 6–8 |
| (b) | Micro-Nutrients | |
| | Fe$_2$O$_3$ | 0.02–0.5 |
| | MnO | 0.006–0.2 |
| | ZnO | 0.006–0.04 |
| | CuO | 0.0025–0.02 |
| | BPO$_4$ | 0.03–0.2 |

13. The composition of claim 12 in the form of dust, powder or small pellets.

14. A method of applying a slow release fertilizer composition in a single application which provides sufficient plant nutrients for one to three years for growing crops which comprises applying the fertilizer composition of claim 13 at a rate of 200 to 1500 lbs. per acre.

15. The method of claim 13 wherein the amount of fertilizer composition applied is for a single year of growing crops and is in the amount of 200 to 600 lbs. per acre.

16. The method of claim 13 wherein the amount of fertilizer composition applied is for three years of growing crops and is in the amount of 600 to 1500 lbs. per acre.

17. The method of claim 13 wherein the fertilizer composition is mixed with water and is applied to the crops in the form of an aqueous dispersion.

18. A slow release fertilizer composition including $K_2SiO_3$ and consisting essentially of the following elements:

|  |  | % by Weight |
|---|---|---|
| (a) | Primary Nutrients |  |
|  | N | 1–4 |
|  | Ca | 12–17 |
|  | P | 7–11 |
|  | Mg | 1–2 |
|  | K | 3–15 |
|  | S | 0.1–5 |
| (b) | Micro-Nutrients |  |
|  | Fe | 0.01–0.3 |
|  | Mn | 0.005–0.15 |
|  | Zn | 0.005–0.03 |
|  | Cu | 0.003–0.015 |
|  | B | 0.003–0.015 |

19. The composition of claim 18 in the form of dust, powder or small pellets.

20. An aqueous mixture containing undissolved slow release fertilizer composition, including $K_2SiO_3$, and containing in solution the following concentrations of essential active nutrient ingredients:

|  |  | PPM |
|---|---|---|
| (a) | Primary Nutrients |  |
|  | $NH_4$ | 12–50 |
|  | Ca | 150–500 |
|  | $PO_4$ | 13–185 |
|  | Mg | 15–60 |
|  | K | 100–500 |
|  | $SO_4$ | 150–1200 |
| (b) | Micro-Nutrients |  |
|  | Fe | 0.1–5 |
|  | Mn | 0.2–0.7 |
|  | Zn | 0.02–0.2 |
|  | Cu | 0.02–0.08 |
|  | B | 0.2–3.0 |
| (c) | Other |  |
|  | $CO_3$ | 10–200 |

* * * * *